Figure 1:
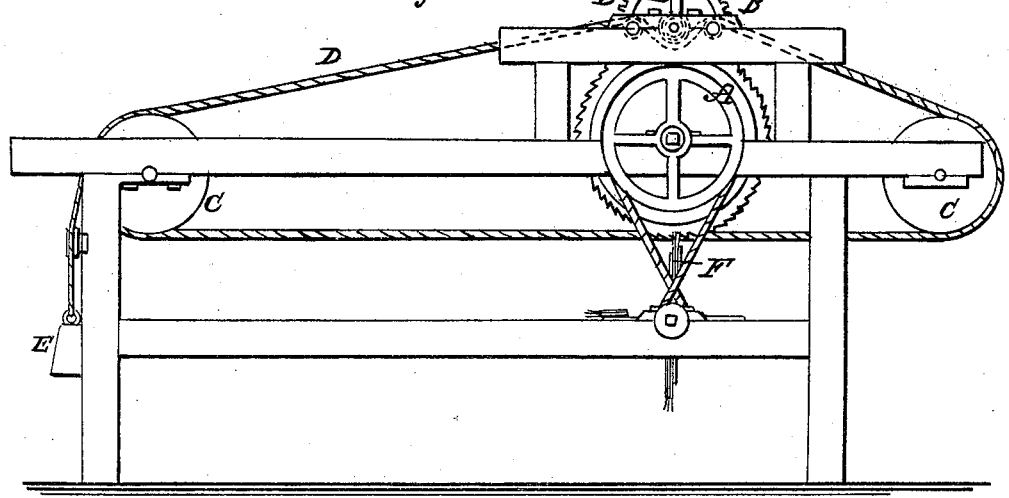
Figure 2:
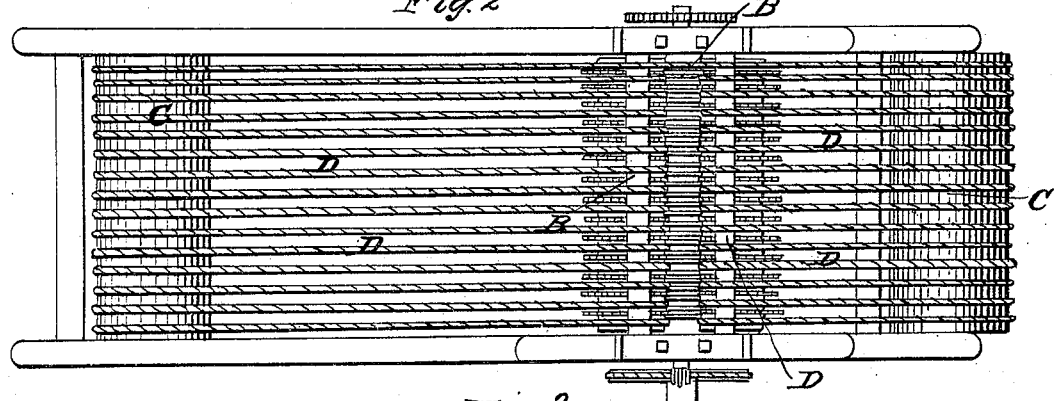
Figure 3:
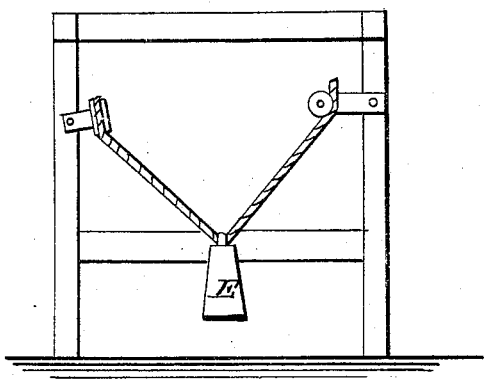

S. OLCOTT.
Flax and Hemp Brake.

No. 1,550. Patented April 11, 1840.

UNITED STATES PATENT OFFICE.

SANDS OLCOTT, OF PHILADELPHIA, PENNSYLVANIA.

MACHINE FOR REDUCING THE FIBERS OF FLAX AND HEMP.

Specification forming part of Letters Patent No. 1,550, dated April 11, 1840.

*To all whom it may concern:*

Be it known that I, SANDS OLCOTT, late of New Hope, now of the city of Philadelphia, and State of Pennsylvania, have invented a new and useful machine for reducing the fibers of flax and hemp to a uniform length, so as to enable them to be spun with facility; and I do hereby declare that the following is a full and exact description.

The nature of my invention consists in the construction of a machine for shortening and equalizing the fibers of flax and hemp by means of a series of circular saws fixed on a cylinder, or teeth fixed in rows around the periphery of a cylinder, and bringing the flax or hemp in contact with them by means of a cord rove over grooved rollers, as hereinafter described.

To enable others skilled in the art to make and use my invention, I will proceed to describe its construction and operation.

The cylinder A in the annexed drawing is a cylinder four feet in length, composed of circular saws twelve inches in diameter, or rows of teeth set at equal distances from each other. The distance is regulated by the length to which the fiber is required to be reduced. The teeth of the saws should be filed sharp at the points and rounding on all the sides, so as not to cut but break the fiber.

B B B are three iron rollers, four feet long and six inches in diameter, lying parallel with the saw-cylinder, and scores or grooves in them, so located that there will be two grooves at the side edge of each saw. The center roller should have a middle groove, in order to allow the edge of the saws to pass deeper than the main periphery of the center roller.

C C are two wooden cylinders of equal length of rollers B B B, and grooved or scored in like manner, as described above.

D is a cord, which is rove round the wooden cylinders on each of the grooves, passing over the outside rollers, B B B, and under the middle roller, always occupying a separate groove as frequently as it is made to pass around the rollers and cylinders.

E is a pulley and weight attached. One of the bights of the cord is rove through this pulley, and by means of the weight the cord is kept at a uniform tightness.

F is a brush driven from the saw-cylinder shaft, which serves to keep the saws and cords clean. All these cylinders and rollers are fixed in a strong frame-work and located as in the drawing. The driving-pulley is fixed in the saw-cylinder shaft, and from this shaft gearing is fixed so as to connect with the rollers B B B. The motion of the saw-cylinder should be about one hundred revolutions and the rollers B B B five per minute.

The machine now being complete, the operator spreads the flax or hemp on the cords lengthwise and parallel with the rollers B B B. The machine being set in motion, the material will follow the cords, passing under the middle one of the rollers B B B. It is brought in contact with the teeth of the saws. At the same time it is firmly held by the cords. It will then be delivered on the cords at the opposite side of the rollers in lengths in proportion to the distance of the saws from each other.

What I claim as my invention, and desire to secure by Letters Patent, is—

The combination of the gang of saws or rows of teeth on a cylinder, with the arrangement of cords and rollers for holding, guiding, and working the flax or hemp, in the manner herein described.

SANDS OLCOTT.

Witnesses:
SARAH OLCOTT,
J. HOPSON.